(12) United States Patent
Ghirardi et al.

(10) Patent No.: US 10,544,812 B2
(45) Date of Patent: Jan. 28, 2020

(54) CLAMP

(71) Applicant: NORMA GERMANY GMBH, Maintal (DE)

(72) Inventors: Fabio Ghirardi, Hanau (DE); Viktor Stoll, Grosskrotzenburg (DE); Gerrit von Breitenbach, Karlstein (DE); Erkan Kayacik, Istanbul (TR)

(73) Assignee: NORMA GERMANY GMBH, Maintal (DE)

( * ) Notice: Subject to any disclaimer, the term of this patent is extended or adjusted under 35 U.S.C. 154(b) by 136 days.

(21) Appl. No.: 15/735,100

(22) PCT Filed: May 3, 2016

(86) PCT No.: PCT/EP2016/059841
§ 371 (c)(1),
(2) Date: Dec. 8, 2017

(87) PCT Pub. No.: WO2016/198214
PCT Pub. Date: Dec. 15, 2016

(65) Prior Publication Data
US 2018/0180075 A1  Jun. 28, 2018

(30) Foreign Application Priority Data

Jun. 10, 2015  (DE) .................. 10 2015 109 207

(51) Int. Cl.
*F16B 2/08* (2006.01)
*F16L 21/06* (2006.01)
(Continued)

(52) U.S. Cl.
CPC .............. *F16B 2/08* (2013.01); *F16L 21/065* (2013.01); *F16L 23/08* (2013.01); *F16L 33/04* (2013.01)

(58) Field of Classification Search
CPC .... Y10T 24/1441; Y10T 24/1443; F16B 2/08; F16B 23/08; F16L 21/065; F16L 33/04
(Continued)

(56) References Cited

U.S. PATENT DOCUMENTS

| 1,487,903 | A | * | 3/1924 | Vitek | ...................... F16L 33/04 24/281 |
| RE22,601 | E | * | 2/1945 | Sprouse | .................. F16L 33/04 24/286 |

(Continued)

FOREIGN PATENT DOCUMENTS

| DE | 3403781 A1 | 8/1985 |
| JP | 2002323023 | 11/2002 |

(Continued)

OTHER PUBLICATIONS

EPO; International Search Report Issued in Corresponding PCT/EP2016/059841; dated Aug. 26, 2016, 2 pages.

(Continued)

*Primary Examiner* — Robert Sandy
(74) *Attorney, Agent, or Firm* — Loeb & Loeb LLP

(57) ABSTRACT

The invention relates to a clamp comprising a clamp band having a clamping head with two clamping jaws, in each of which a guide-through opening is formed, through which a clamping element for clamping the clamp is guided, wherein at least one contact surface is formed on a respective edge of the guide-through openings, on which contact surface a support surface of the clamping element can at least partially be contacted. In order to achieve minimum inner tensions in the clip, the clamping jaws are arranged at an angle to one another, wherein at least one reinforcing bead is formed in the clamping jaws and one of the clamping jaws has an anti-rotation means for the clamping element.

15 Claims, 3 Drawing Sheets

(51) Int. Cl.
*F16L 23/08* (2006.01)
*F16L 33/04* (2006.01)

(58) Field of Classification Search
USPC .......................................................... 285/410
See application file for complete search history.

(56) References Cited

U.S. PATENT DOCUMENTS

| | | | | |
|---|---|---|---|---|
| 3,477,106 | A * | 11/1969 | Tetzlaff | F16L 33/02 24/279 |
| 7,396,053 | B2 * | 7/2008 | Webb | F16L 17/04 24/279 |
| 2002/0166214 | A1 | 11/2002 | Wachter | |
| 2005/0029813 | A1 | 2/2005 | Geppert et al. | |
| 2005/0246869 | A1 | 11/2005 | Chene et al. | |
| 2007/0176425 | A1 | 8/2007 | Ma et al. | |
| 2014/0007385 | A1 * | 1/2014 | Rigollet | F16L 33/06 24/280 |
| 2018/0180075 | A1 | 6/2018 | Ghirardi | |

FOREIGN PATENT DOCUMENTS

| | | |
|---|---|---|
| JP | 2007170581 | 7/2007 |
| JP | 2008202791 | 9/2008 |
| KR | 101071491 | 3/2005 |
| KR | 20130122751 | 11/2013 |
| WO | 2004008015 | 1/2004 |

OTHER PUBLICATIONS

Korean Office Action (including English translation) issued in KR Patent Application No. 10-2018-7000782, dated Jan. 29, 2019, 23 pages.

Notification of Reasons for Refusal for related application No. 2017-563073 dated Oct. 16, 2018 (13 pages).

* cited by examiner

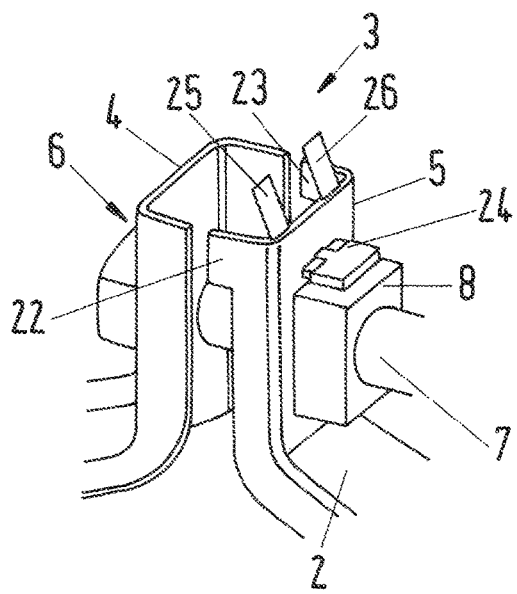
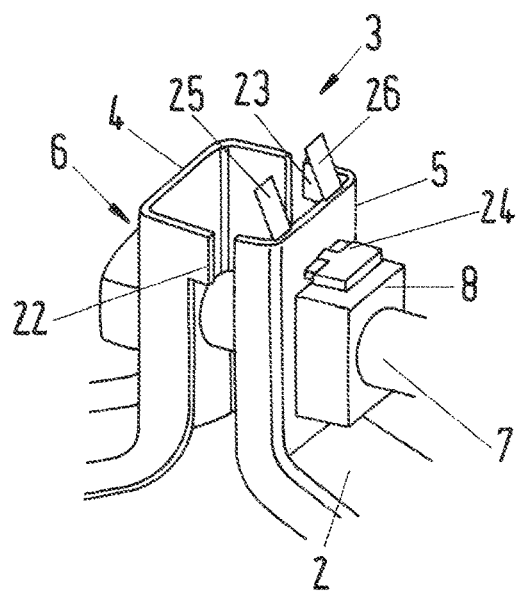
Fig.4a   Fig.4b
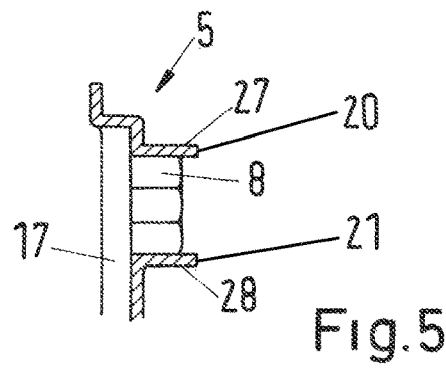
Fig.5
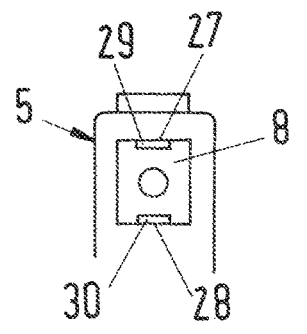
Fig.6

CLAMP

FIELD OF THE INVENTION

The invention relates to a clamp having a clamp band according to the preamble of claim 1.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Clamps such as hose clamps and profile clamps are used variously, such as, for example, for securing the ends of pipes to pipe connectors or, in the case of profile clamps, for connecting pipes. When tensioning the clamps by means of the clamping element, the clamping jaws of the clamping head are moved toward one another, as a result of which an internal diameter of the clamp band is reduced. A radially inwardly directed clamping force is thus generated, axial clamping forces being applied additionally in the case of profile clamps. Ends of pipes, which are provided with corresponding flanges which are engaged around by the clamp, can be pressed together axially by means of said axial clamping forces.

Stresses, which can influence the long-term durability in a disadvantageous manner, occur inside the clamp as a result of tensioning the clamp. The clamp holding securely cannot always be ensured specifically when greater temperature differences arise.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

The object underlying the invention then is to provide a clamp where the occurrence of internal stresses is extensively reduced and which is suitable, in particular, for high temperature applications.

Said object is achieved by a clamp with the features of claim 1. Configurations are the object of the subclaims.

In the case of a clamp having a clamp band which comprises a clamping head with two clamping jaws, a feed-through opening, through which a clamping element is fed for tensioning the clamp, being realized in each of said clamping jaws, wherein at least one contact surface, on which a support surface of the clamping element can be placed at least in part, is realized on an edge of each of the passage openings, it is provided according to the invention that the clamping jaws are arranged at an angle with respect to one another, wherein at least one reinforcing bead is realized in the clamping jaws and one of the clamping jaws comprises an anti-rotation device for the clamping element.

Said combination of measures, namely on the one hand the reinforcing bead for the general stiffening of the clamping jaws, the angled arrangement of the clamping jaws and the integrated anti-rotation device for the clamping element, results in a determining of deforming regions of the clamp which are able to be correspondingly designed. Internal stresses in the remaining material of the clamp are thus kept small. As a result, the clamp becomes more reliable even in the case of temperature changes and/or high temperatures as fewer internal stresses, which can result in irregular deformation, have to be removed.

The reinforcing bead extends, in this case, in particular, along a center line of the clamping jaw which runs perpendicularly to the clamping element and to an axis of symmetry of the clamp band.

In this case, it is particularly preferred for there to be a linear correlation between the operating forces and the clamping force as a result of the deformation of the clamping jaws during the tensioning operation. Simple control of the clamping forces introduced and good reproducibility is consequently produced.

The clamping element preferably comprises a screw bolt with a nut, wherein, where applicable, the screw bolt comprises an external thread with a friction-reducing coating. As a result, there is a further reduction in friction losses during the tensioning of the clamp such that high clamping forces can be generated and adjusted in a relatively precise and reproducible manner.

In a preferred configuration, the clamping jaws are inclined at an angle to one another in such a manner that, during the tensioning operation, first of all they contact one another in part and, when clamped further, they bear against one another. The clamping jaws are therefore not aligned parallel to one another as is otherwise usual, but at an angle. As a result, there is gradual deformation during the tensioning operation, the clamping jaws first of all only abutting against one another at an edge and finally bearing against one another in a planar manner. A defined increase in the necessary operating forces is consequently achieved.

An angle of inclination between the clamping jaws is preferably more than 0° and up to 20°. In relation to an imaginary center line which runs through the radius and between the clamping jaws at a same spacing to said clamping jaws, each clamping jaw is then at an angle amount of between 0° and 10°, the clamping jaws being angled at the identical angle amount but with different signs. The clamping jaws are therefore arranged in a symmetrical manner.

In a preferred configuration, at least one clamping jaw comprises at least one lug which is directed to the other clamping jaw. During the tensioning operation, a first contact is then effected by means of the lug which is deformed elastically during further tensioning and consequently forms targeted deformation resistance. This can be utilized for the purpose of adjusting a linear increase in force during the tensioning operation.

The lug is preferably realized in one piece with the clamping jaw. The lug is formed for this reason, for example, from a protruding part of the clamping jaw which is bent correspondingly in relation to the clamping jaw.

As an alternative to this, the lug can be realized as an element which is held on the clamping jaw with the clamping element. The lug can then be formed relatively simply from a different material to the rest of the clamp and can also be fitted easily in retro.

In a preferred manner, the element is realized as an anti-rotation device for the nut. Mounting or tensioning the clamp is consequently simplified as the nut does not have to be locked when the screw bolt is screwed in. One-handed operation is possible as a result.

At least one lug is preferably arranged in each case on both clamping jaws. Said lugs then come into contact with one another during the tensioning operation and bring about a gradual increase in deformation resistance until the clamping jaws finally bear against one another in a planar manner and further clamping is no longer possible.

In particular when at least one of the contact surfaces comprises a friction-reducing coating, the operating forces necessary to move the clamping element are reduced as friction forces, which make movement of the clamping element difficult when there is contact between the contact surface and the support surface of the clamping element, are reduced. Consequently, higher clamping forces are able to be generated. In addition, the clamping forces can be adjusted more precisely as fewer losses, which produce imprecision, occur as a result of the reduction in friction forces. Consequently, there is better reproducibility of the adjusted clamping forces, which also satisfies higher quality demands.

In a preferred configuration, the contact surface is raised, wherein the contact surface is smaller than the support surface of the clamping element. The size of the actual contact surface is thus minimized, as a result of which the friction occurring is also further reduced.

In this case, it is particularly preferred that the contact surface is realized in the form of, in particular, two diametrically opposed circle segments. Consequently, sturdy, wobble-free support of the support surface on the multi-part contact surface is possible. As an alternative to two circle segments, the contact surface can also be distributed on several circle segments, for example three or four, which are distributed, in particular uniformly, on the edge of the feed-through opening.

The contact surface is preferably arranged in the region of the reinforcing bead which is realized in the clamping jaw. Said reinforcing bead protrudes, as a rule, beyond the surrounding surface of the clamping jaw and can thus realize the raised contact surfaces without further reworking being necessary. Consequently, production expenditure is kept low.

The clamp is preferably realized as a profile clamp, wherein the clamp band includes a base and two radially inwardly directed flanks. In this case, the clamp band can comprise, in particular, a trapezoidal or triangular cross section. In the case of a triangular cross section, the base is formed by the tip in the region of the connection between the flanks. As a result of a realization as a profile clamp, not only radial but also axial clamping forces can be introduced. There are thus diverse application possibilities for the clamp.

In this case, it can be provided that at least one recess is realized in at least one position in at least one of the flanks. In particular, in this case, recesses which are aligned with one another can be provided at the same position in both flanks. Recesses impart a certain flexibility to the clamp band in order to be able to widen an internal diameter until the clamp is able to be moved over corresponding flanges on the pipes.

BRIEF DESCRIPTION OF THE DRAWINGS

Further features, details and advantages of the invention are produced from the wording of the claims and from the following description of exemplary embodiments by way of the drawings, in which:

FIG. 4a and FIG. 4b show embodiments of a clamping head of the clamp.
FIG. 5 shows a sectioned side view of a clamping jaw,
FIG. 6 shows a top view of a clamping jaw.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
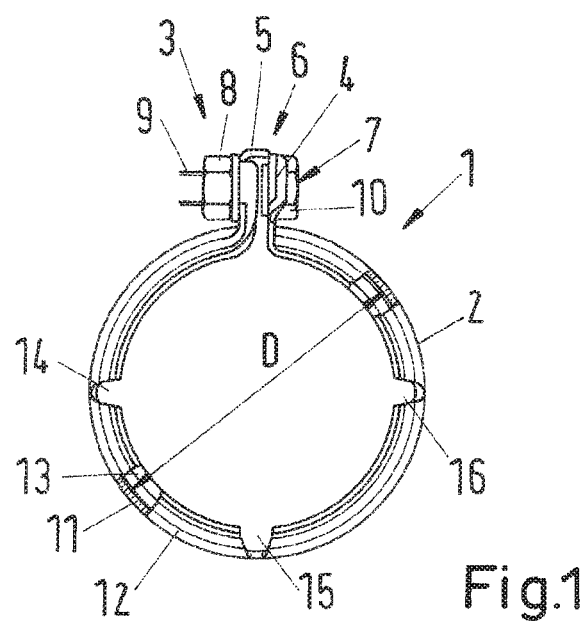
FIG. 1 shows a side view of a clamp.

FIG. 1 shows a clamp 1 realized as a profile clamp with a clamp band 2 and a clamping head 3. The clamping head 3 includes two clamping jaws 4, 5 which can be moved toward one another by way of a clamping element 6, as a result of which an internal diameter D of the clamp band 2 is reduced.

The clamping element 6 comprises a screw bolt 7 and a nut 8, the screw bolt being fed through feed-through openings which are not visible in FIG. 1 and are realized in the clamping jaws 4, 5. In this case, the screw bolt 7 comprises an external thread 9 onto which the nut 8 is screwed. A head 10 of the screw bolt 7 and the nut 8 abut in each case against contact surfaces which are realized on outer sides of the clamping jaws 4, 5.

The clamp band 2 comprises a triangular cross sectional profile. For this, the clamp band 2 includes a base 11, from which two flanks 12, 13 extend in a radially inwardly angled manner. In order to achieve sufficient flexibility of the clamp band 2, so that the clamp can be tightened, recesses 14, 15, 16 are admitted at three positions in the flanks 12, 13 of the clamp band 2. A smaller or larger number of recesses is also possible.

Figure 2:
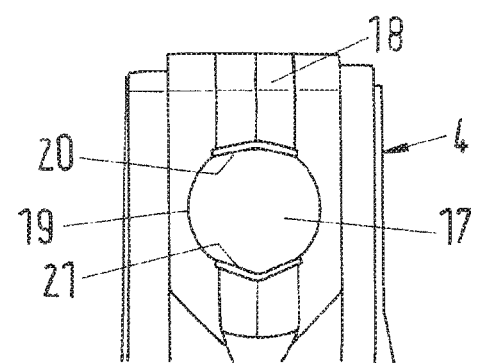
FIG. 2 shows a clamping jaw of the clamp.

FIG. 2 shows the clamping jaw 4 of the clamping head 3 with the feed-through opening 17 for the clamping element 6. The clamping jaw 4 comprises a vertically extending reinforcing bead 18 which extends centrally through the feed-through opening 17 and is interrupted by said feed-through opening.

Figure 3:
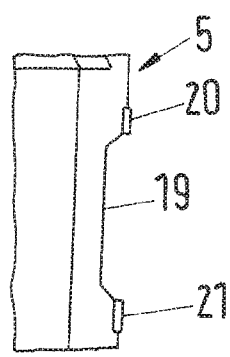
FIG. 3 shows a side view of the clamping jaw.

A contact surface for the clamping element 6 is realized on an edge 19 of the feed-through opening 17 in the form of two circle segments 20, 21 which are provided with a friction-reducing coating. As can be seen from FIG. 3, the contact surface formed from the circle segments 20, 21 is raised in relation to the rest of the edge 19 such that clamping element 6 moves into abutment with the clamping jaw 4 only in a relatively small region.

The second clamping jaw 5 can be constructed in an analogous manner.

FIG. 4a shows a detail of the clamp 2 with the clamping head 3, elastically deformable lugs 22, 23 which are directed to the other clamping jaw 4 being realized on the clamping jaw 5. In another embodiment according to FIG. 4b, the elastically deformable lug 22 is arranged on the clamping jaw 4 and the elastically deformable lug 23 is arranged on clamping jaw 5. Further elastically deformable lugs 25, 26, which can be provided as an alternative to or in addition to the lugs 22, 23, are realized on an additional element 24, which is held on the clamping jaw 5 by means of the clamping element 6. In the case of said exemplary embodiment, the element 24 also serves as an anti-rotation device for the nut 8 of the clamping element 6. The anti-rotation device reduces any play arising during the tensioning operation or when the screw bolt 7 is screwed in and thus enables more precise control of the stress introduced.

FIG. 5 shows a sectioned side view of the clamping jaw 5 of a preferred embodiment where holding lugs 27, 28 are bent out from the feed-through opening 17 in such a manner that they receive the nut 8 between them. The holding lugs 27, 28 serve, in this case, as an anti-rotation device and prevent entrainment of the nut 8 when the screw bolt 7 is screwed in. One-handed tensioning of the clamp 1 is consequently possible.

Where applicable, the holding lugs 27, 28 can press against the nut 8 at a preliminary tension such that said nut is already secured on the clamping jaw 5 prior to the introduction of the screw bolt 7.

FIG. 6 shows a configuration with a nut 8 which comprises in each of two oppositely situated sides a groove 29, 30, in which the holding lugs 27, 28 engage. A particularly sturdy, defined bearing arrangement of the nut 8 is produced as a result.

Figure 7:
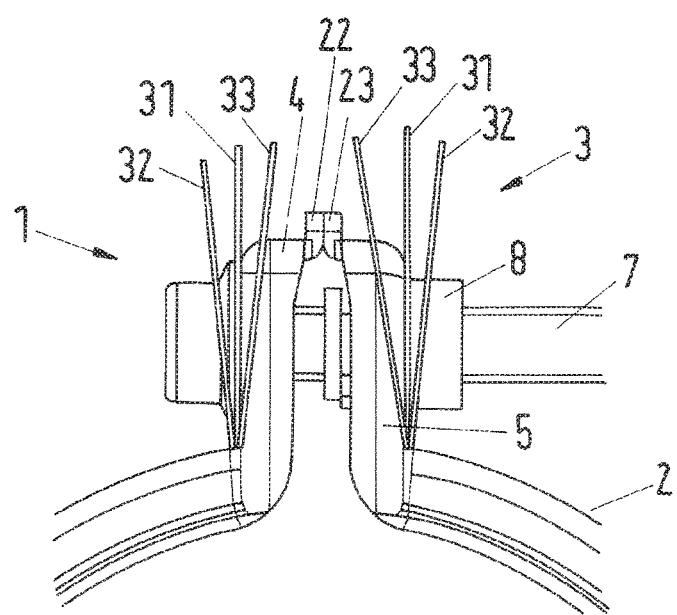
FIG. 7 shows a side view of the clamping head.

FIG. 7 shows a detail of the clamp 1 showing the clamping head 3. The clamping jaws 4, 5, in this case, with the deforming of the lugs 22, 23, do not yet fully bear against one another, the clamp 1 is therefore not yet fully tensioned.

In the representation shown, the clamping jaws 4, 5 are aligned parallel to one another, they consequently run parallel to an imaginary vertical line 31, 31'. Imaginary lines, which indicate the inclination outward in each case by a maximum of 5°, about which the clamping jaws 4, 5 can be angled outward in the non-clamped state, are shown by way of the reference 32, 32'. Imaginary lines, which indicate the inclination inward in each case by a maximum of 5°, about which the clamping jaws 4, 5 can be angled inward in the non-clamped state, are shown by the reference 33, 33'. An angle with an amount that is greater than 0° and smaller than or equal to 10° is consequently enclosed between the clamping jaws. This results in the clamping jaws, during the tensioning operation, gradually bearing against one another with elastic deformation, the deformation resistance produced by the elastic deformation being able to be detected, for example, by an automatic setting tool in order to enable automated, reproducible mounting in this way.

The invention is not limited to one of the afore-described embodiments, but is modifiable in diverse ways. The clamp according to the invention enables the introduction of higher clamping forces with fewer internal stresses and, in this case, is suitable, in particular, for high temperature application and applications with changing temperatures.

All features and advantages produced from the claims, the description and the drawing, including structural details, spatial arrangements and method steps can be essential to the invention both on their own per se and also in the most varied combinations.

LIST OF REFERENCES

1. Clamp
2. Clamp band
3. Clamping head
4. Clamping jaw
5. Clamping jaw
6. Clamping element
7. Screw bolt
8. Nut
9. External thread
10. Head
11. Base
12. Flank
13. Flank
14. Recess
15. Recess
16. Recess
17. Feed-through opening
18. Reinforcing bead
19. Edge
20. Circle segment
21. Circle segment
22. Lug
23. Lug
24. Element
25. Lug
26. Lug
27. Holding lug
28. Holding lug
29. Groove
30. Groove
31. Line
32. Line
33. Line

The invention claimed is:

1. A clamp comprising:
a clamp band;
a clamping head with two clamping jaws; and
a feed-through opening, through which a clamping element is fed for tensioning the clamp, the feed-through opening being formed in each of said clamping jaws;
wherein at least one contact surface is formed on an edge of the feed-through opening on a first of said clamping jaws, the at least one contact surface is configured to receive at least a part of a support surface of the clamping element, the two clamping jaws are arranged at an angle with respect to one another, at least one reinforcing bead is formed in each of the two clamping jaws, a second of said clamping jaws comprises an anti-rotation device for the clamping element, the at least one reinforcing bead formed in each of the clamping jaws extends along center lines of the two clamping jaws, and the center line runs perpendicularly to the clamping element and to an axis of symmetry of the clamp band.

2. The clamp as claimed in claim 1, wherein the clamping element comprises a screw bolt with a nut, and the screw bolt comprises an external thread with a friction-reducing coating.

3. The clamp as claimed in claim 2, wherein the clamping jaws are inclined at the angle with respect to one another in such a manner that, during a tensioning operation, the clamping jaws first contact one another in part and, when clamped further, the clamping jaws bear against one another.

4. The clamp as claimed claim 3, wherein the angle between the clamping jaws is more than 0° and up to 10°.

5. The clamp as claimed in claim 4, wherein one of the two clamping jaws comprises at least one deformable lug, wherein the at least one deformable lug is directed to another of the two clamping jaws.

6. The clamp as claimed in claim 5, wherein the at least one deformable lug is formed in one piece with the one of the two clamping jaws.

7. The clamp as claimed in claim 5, wherein the at least one deformable lug is an element which is held on the clamping jaw with the clamping element.

8. The clamp as claimed in claim 7, wherein the anti-rotation device is formed by the element.

9. The clamp as claimed in claim 8, wherein at least one deformable lug is arranged on each of both clamping jaws.

10. The clamp as claimed in claim 9, wherein at least one of the contact surfaces comprises a friction-reducing coating.

11. The clamp as claimed in claim 10, wherein the at least one contact surface is raised, and the at least one contact surface is smaller than the support surface of the clamping element.

12. The clamp as claimed in claim 11, wherein the at least one contact surface has the form of two diametrically opposite circle segments.

13. The clamp as claimed in claim 12, wherein the at least one contact surface is arranged in the region of the at least one reinforcing bead which is formed in each of the two clamping jaws.

14. The clamp as claimed in claim 13, wherein the clamp is a profile clamp, the clamp band includes a base and two radially inwardly directed flanks, and the clamp band comprises a trapezoidal or triangular cross section.

15. The clamp as claimed in claim 14, wherein at least one recess is formed in at least one position in at least one of the flanks.

* * * * *